(12) United States Patent
Kluepfel et al.

(10) Patent No.: US 11,654,673 B2
(45) Date of Patent: May 23, 2023

(54) PRINTING PLATE WORKFLOW CONTROLLED WITH THE AID OF THE TRANSPORT CART

(71) Applicant: HEIDELBERGER DRUCKMASCHINEN AG, Heidelberg (DE)

(72) Inventors: Martin Kluepfel, Hockenheim (DE); Ingo Schilz, Schriesheim (DE); Matthias Beyer, Dossenheim (DE); Andre Strunk, St. Leon-Rot (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 17/195,945

(22) Filed: Mar. 9, 2021

(65) Prior Publication Data
US 2021/0283898 A1    Sep. 16, 2021

(30) Foreign Application Priority Data
Mar. 11, 2020  (DE) ................. 10 2020 106 596.5

(51) Int. Cl.
| | |
|---|---|
| B41F 33/00 | (2006.01) |
| G06K 19/06 | (2006.01) |
| B41F 27/00 | (2006.01) |

(52) U.S. Cl.
CPC ........ B41F 33/0009 (2013.01); B41F 27/005 (2013.01); G06K 19/06028 (2013.01)

(58) Field of Classification Search
CPC ............... B41F 33/0009; B41F 27/005; G06K 19/06028
See application file for complete search history.

(56) References Cited

U.S. PATENT DOCUMENTS

| | | |
|---|---|---|
| 5,058,500 A | 10/1991 | Mizuno |
| 7,159,516 B2 | 1/2007 | Schneider et al. |
| 8,191,473 B2 | 6/2012 | Alt-Steiner et al. |

(Continued)

FOREIGN PATENT DOCUMENTS

| | | |
|---|---|---|
| DE | 3908270 A1 | 9/1989 |
| DE | 10314341 B3 | 8/2004 |

(Continued)

*Primary Examiner* — David H Banh
(74) *Attorney, Agent, or Firm* — Laurence A. Greenberg; Werner H. Stemer; Ralph E. Locher

(57) ABSTRACT

A method correctly mounts printing plates in a printing press. The method uses prepress software, a transport device, an identification device disposed on the transport device or on a printing plate, and a scanning device. The prepress software defines a sequence of print jobs to be processed by the printing press and sends data for making the printing plates for the print jobs defined in the processing sequence to a platesetter. The platesetter produces the corresponding printing plates. The produced printing plates are deposited on the transport device, the transport device is conveyed to the printing press, and the identification device of the transport device or of a printing plate is scanned by a scanning device at the printing press and the print jobs that have been identified in this way are compared to the print jobs which the prepress software has assigned to the printing press.

10 Claims, 1 Drawing Sheet

(56) References Cited

U.S. PATENT DOCUMENTS

| | | | |
|---|---|---|---|
| 2009/0294540 A1* | 12/2009 | Johnson | B41C 1/00 101/463.1 |
| 2011/0197778 A1* | 8/2011 | Barthelme | B41F 27/1206 101/479 |
| 2011/0265675 A1* | 11/2011 | Barthelme | B41F 33/14 101/477 |
| 2011/0271860 A1* | 11/2011 | Barthelme | B41F 27/1206 101/477 |
| 2012/0067237 A1* | 3/2012 | Alt-Steiner | B41F 33/0009 101/477 |
| 2014/0367464 A1* | 12/2014 | Herzig | G06K 19/06028 235/375 |
| 2016/0288480 A1* | 10/2016 | Sakamoto | B41M 1/40 |
| 2019/0351688 A1* | 11/2019 | Sievers | B41M 1/04 |
| 2020/0016916 A1* | 1/2020 | Sievers | G03F 7/2022 |

FOREIGN PATENT DOCUMENTS

| | | | |
|---|---|---|---|
| DE | 102008002681 A1 | 12/2009 | |
| DE | 102009002251 A1 | 12/2009 | |

\* cited by examiner

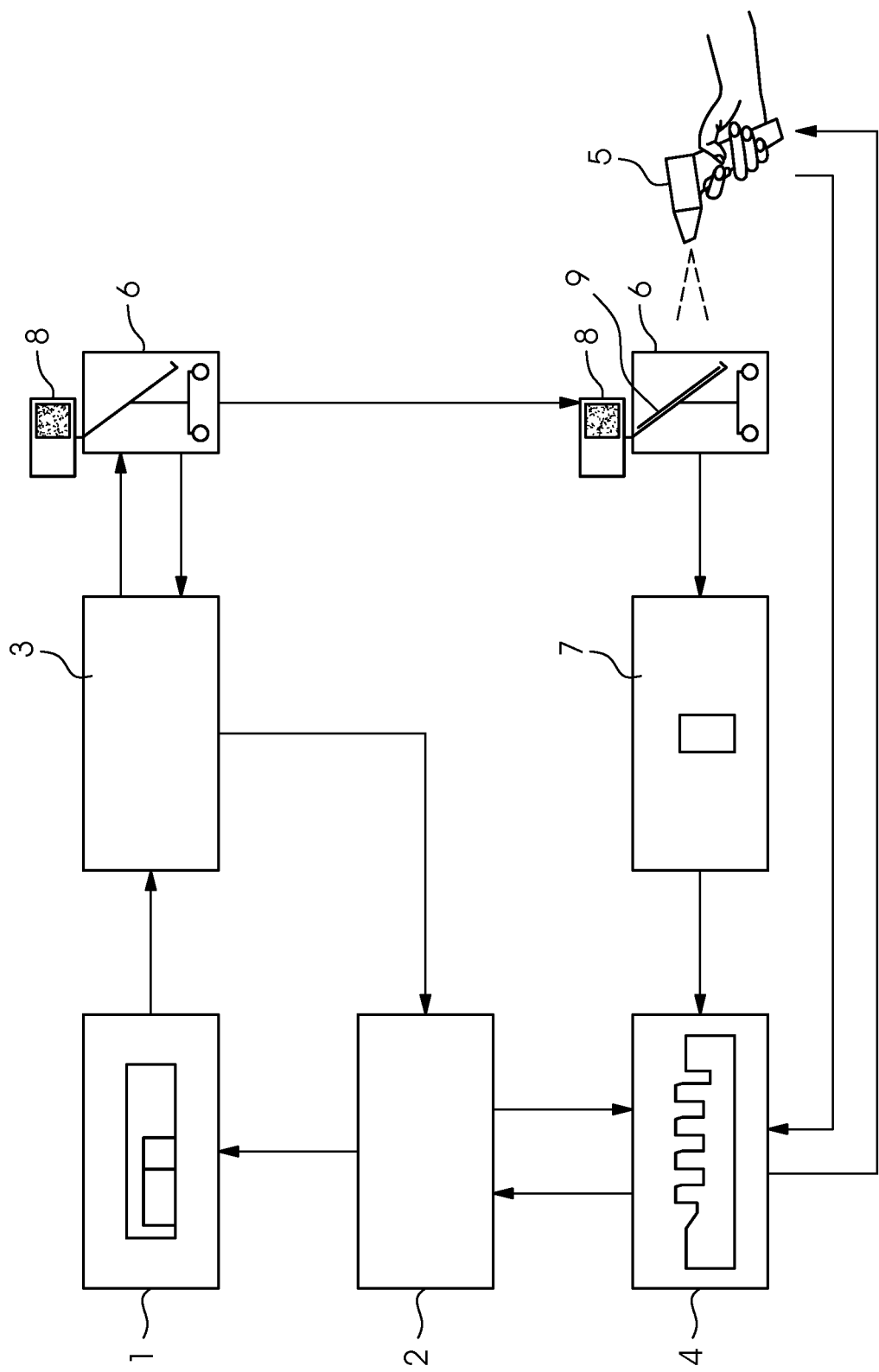

PRINTING PLATE WORKFLOW CONTROLLED WITH THE AID OF THE TRANSPORT CART

CROSS-REFERENCE TO RELATED APPLICATION

This application claims the priority, under 35 U.S.C. § 119, of German patent application DE 10 2020 106 596.5, filed Mar. 11, 2020; the prior application is herewith incorporated by reference in its entirety.

BACKGROUND OF THE INVENTION

Field of the Invention

The present invention relates to a method of correctly mounting printing plates in a printing press to be equipped with printing plates. The method uses prepress software, at least one transport device or a printing plate with an identification device, and a scanning device at the printing press.

A known prior art approach is to provide control elements next to the print on printing plates to control and monitor the printing operation. For this purpose, print control strips for color measurements and register marks for controlling the register have been applied next to the print on the printing plates for the past few years. Another known approach is additionally to provide codes such as a bar code to a printing plate to identify the printing plate. Both the bar code and the print control strip as well as the print are written onto the printing plate in the platesetter. A prepress software such as Prinect, a workflow control software in the graphic industry, generates the associated print control strips and the bar code in addition to the print and prepares them for application to the printing plate by the platesetter. In this manner, the bar code may be used to identify individual printing plates, for instance when they are to be mounted to the printing press for a job change to ensure that the correct printing plate is mounted in the printing press.

BRIEF SUMMARY OF THE INVENTION

It is accordingly an object of the invention to provide a method of correctly mounting printing plates in a printing press to be equipped with printing plates, in particular a method that provides a reliable way of correctly handling multiple printing plates for multiple print jobs on a transport device such a printing plate transport cart.

In accordance with the invention, this object is attained by a method as described in the independent method patent claim. Advantageous embodiments of the present invention will become apparent from the dependent claims, the description, and the drawing.

In accordance with the invention, a method of correctly mounting printing plates in a printing press to be equipped with printing plates requires at least one printing press which preferably communicates with the prepress department, preferably via an internet or intranet connection. The prepress department has software for administrating print jobs and for processing them for a printing operation so that the print jobs can be written onto printing plates in a platesetter. These one or more platesetters are likewise connected to the prepress department via an internet or intranet connection. In addition, a transport device is provided for transporting exposed printing plates from the platesetter to the printing press. In addition, a scanning device is provided on the printing press or in the vicinity of the printing press. The scanning device may scan an identification device on the transport device or on a printing plate to be able to identify the transport device or the printing plate at the printing press. A first step is to define a sequence of print jobs to be processed on the printing press by means of the prepress software. This is preferably done as a function of the further resources of the print shop such as further printing presses and as a function of the characteristics of the print jobs and of the consumables such as printing substrates and inks required for this purpose. To optimize the printing operation, the prepress software calculates the optimum sequence of the print jobs to be processed on a printing press and forwards the data which are required for setting the plates to the platesetter.

In the sequence defined by the prepress software, the platesetter then creates the printing plates required to process the print job. The printing plates that have been produced in this way are then deposited on the transport device. The transport device is subsequently conveyed to the printing press; in this process, the identification device on the transport cart or on a printing plate is scanned at the printing press or in the vicinity of the printing press to identify the transport device which has arrived at the printing press. Then, as a function of the transport device that has been identified in this way, the associated print jobs are compared to the print jobs the prepress software has assigned to the printing press. This comparison with the print jobs assigned to the printing press may be made on the computer of the printing press or centrally on a computer running the prepress software because the allocation of the print jobs to the printing presses may be saved as a data set on both computers. This is a way initially to determine whether the print jobs assigned to the printing press and the printing plates delivered by the transport device are a match. Usually this will be the case. Yet if an employee has moved the wrong transport device to the printing press, for instance, this error will definitely be found out by the comparison and a warning will be emitted on the printing press to indicate that the print jobs assigned to the printing press and the printing plates delivered by the transport device do not match. In this way, an operator at the printing press will immediately be alerted to the fact that there are deviations. This is especially important in cases in which the prepress department has already forwarded the print job data and settings required for the production run to the printing press because in this case, the data which have already been forwarded need to be adapted to the print jobs which are actually present on the transport device or the transport device needs to be exchanged.

One embodiment of the present invention envisages that if the sequence of the print jobs on the transport device deviates from the sequence of the print jobs the prepress software has assigned to the printing press, a control unit of the printing press adapts the sequence of the print jobs in the printing press to the sequence of the print jobs on the transport device. In this case the print jobs on the transport device and the print jobs that have already been forwarded to the printing press or are yet to be forwarded to the printing press basically match but their sequence on the transport device has been changed either by chance or on purpose when the printing plates were transferred from the platesetter to the transport device. The comparison envisaged by the invention causes this error to be detected; thus the sequence of the jobs in the printing press may be adapted to the sequence of the print jobs on the transport device to ensure that when the printing plates are mounted to the printing press in the sequence in which they are in the transport device, the matching print jobs will be uploaded to the printing press. An important advantage of this is that the operator of the printing press may mount the printing plates which have been delivered by the transport device in the normal way and does not have to adapt them to the sequence of the print jobs in the printing press. This avoids errors because according to experience, the operators of a printing press mount the printing plates to the printing press in the sequence in which they are delivered.

A further embodiment of the present invention envisages that the prepress software receives feedback from the identification device of the transport device, identifies the transport device, and forwards the result of the identification to the corresponding printing press and to the scanning device disposed at the printing press in question. In this way, the transport device is recorded before it is moved to the respective printing press, ensuring an unequivocal correlation between the printing plates created in the platesetter and the transport device which transports them. This forwarding of information to the corresponding printing press in turn ensures that when a transport device arrives at the printing press and is scanned, it is the previously identified correct transport device that is checked. If a different transport device arrives at the printing press, the print jobs that have been sent to it cannot be processed and a warning appears. Then the operator may choose between exchanging the transport device, i.e. moving the correct transport device with the correct printing plates to the printing press, and downloading the print jobs that correspond to the identified transport device from the prepress software to the printing press.

A further embodiment of the present invention envisages that the platesetter includes a downstream sorting and stacking unit which deposits the produced printing plates on the transport device. This downstream sorting and stacking unit automatically deposits the printing plates produced by the platesetter on the transport device, thus preventing the printing plates from being mixed up and an operator from getting the sequence of the print jobs on the transport device wrong. When the transport device is loaded, the correlation between the printing plates and the transport device is forwarded to the prepress software and saved in the latter. This further enhances reliability and ensures that the transport device will always receive the correct print jobs and the correct printing plates in the correct sequence.

The transport device is preferably a printing plate transport cart or a transport container. A printing plate transport cart in particular may be easily moved from the platesetter to the printing press, thus ensuring that the printing plates generated in the platesetter are securely and reliably transported to the printing press.

The process reliability of the chain from the platesetter to the printing press may be further enhanced by conveying the printing plates from the transport device into the printing press by means of a printing plate logistics device such as a printing plate cart lift and by mounting them in an automated plate changing process. In this case, the use of a printing plate cart lift in connection with an automated printing plate changer ensures that when the printing plates are removed from the printing plate transport device, no printing plate mounting error occurs and the printing plates will always be mounted to the printing press in the correct way. Alternatively or additionally, it is possible to provide printing plate scanners at every printing unit to check whether the correct printing plate is mounted to the correct printing unit. This is another way of ensuring that the correct printing plates arrive in the printing units. If the sequence of the print jobs in the printing press changes because a different sequence of print jobs is detected on the transport cart, the scanning devices at the printing units are informed of the changed sequence so that the machine control unit may verify the correct new sequence as the printing plates are mounted to the printing units.

A further advantageous embodiment of the present invention envisages that the scanning device of a printing press is a hand-held scanner which is used to scan the identification device of the transport device or of a printing plate and transmits the result to a control unit of the printing press either by wire or wirelessly. A wireless hand-held scanner in particular is a convenient means to scan the identification device of the transport device such as a transport cart and thus to check which transport device carrying which print jobs in which sequence has actually been moved to the printing press. In most cases, an existing printing press may easily be retrofitted with such a hand-held scanner, in particular a wireless one, by integrating the receiver of the hand-held scanner into the control unit of the printing press. This is an easy way of retrofitting existing printing presses with the method of the invention.

Another advantageous feature envisaged by the invention is that when the prepress software defines the sequence of the print jobs, it combines the printing plates lying on the transport device and associated with the corresponding print jobs in one file. Such a file is also known as a batch file; it provides a correct allocation of print jobs to a transport device in the correct sequence. Then it is sufficient to link this file in the prepress software with the identification device of the transport device or of a printing plate on the transport device to create a fixed correlation between the sequence of the print jobs and the transport device on the prepress software side. Since the data are linked in the batch file, it is even sufficient to scan a printing plate because the scanned printing plate may be used to identify the associated batch file, which may in turn be used to identify the other printing plates which have been assigned to a transport device since the printing plates, their sequence, and the transport device are firmly linked in the batch file.

The identification device of the transport device is preferably a bar code or QR code. This type of codes may be read in a particularly reliable way even by hand-held scanners on the printing press.

The present invention will be described and explained in more detail below based on a FIGURE. The drawing illustrates the method of the invention as it is used in a print shop including a platesetter, a printing plate sorter/stacker, a printing plate transport cart, a hand-held scanner, an automated printing plate cart lift, and an offset printing press.

Other features which are considered as characteristic for the invention are set forth in the appended claims.

Although the invention is illustrated and described herein as embodied in a printing plate workflow controlled with the aid of the transport cart, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is an illustration describing a method according to the invention.

DETAILED DESCRIPTION OF THE INVENTION

Referring now to the single FIGURE of the drawing in detail, there is shown a method of the invention as it is used in a print shop which has prepress 2 software connected to a platesetter 1 and to an offset printing press 4.

An example of such prepress software is the Prinect software by Heidelberger Druckmaschinen AG. The Prinect software basically provides a digital connection between all components of a print shop and to the internet. In the prepress 2 software, the incoming print jobs are arranged in the correct sequence in which they are to be processed on the printing press 4 and the information is combined in a file such as a batch file. The digital data required for the processing of the print jobs that have been planned in this way and the batch file are then sent to the printing press 4 to be able to set up the printing press 4 in the correct way to process the planned print jobs. At the same time, the prepress 2 software sends the print job data to the platesetter 1, which uses the print job data to produce the necessary printing plates 9. As shown in the FIGURE, the printing plate sorter/stacker 3 automatically deposits the printing plates 9 created in the platesetter 1 on a printing plate transport cart 6. The printing plate transport cart 6 is provided with an identification device 8 in the form of a QR code. The QR code 8 may be read by scanning devices 5. The printing plate sorter/stacker preferably also has a scanning device which identifies the printing plate transport cart 6 that has docked at the printing plate sorter/stacker 3. For this purpose, a scanner at the printing plate sorter/stacker 3 reads the QR code 8 out and thus identifies the printing plate transport cart 6.

The printing plate transport cart 6 with the printing plates 9 is then transported to the printing press 4. When it arrives, an operator of the press 4 may use a hand-held scanner 5 present at the printing press 4 to scan the QR code 8 of the printing plate transport cart 6. The data that have been read out in this manner are then compared to the print job data that the prepress 2 software has sent to the printing press 4. If the jobs do not match, a warning is issued. The operator of the printing press 4 may then access the prepress 2 software to download the print jobs which match the print jobs on the printing plate transport cart 6 to the printing press 4. If it is only the sequence of the print jobs on the transport cart 6 that is incorrect, the control unit of the printing press 4 may automatically adapt the print jobs downloaded to the printing press 4 to the sequence of the print jobs on the printing plate transport cart 6. The printing plates 9 are then automatically conveyed into the printing press 4 by the printing plate lift 7 to be mounted. Then the press is set up for the print jobs, which are subsequently processed.

If the print shop does not have a printing plate sorting/stacking device 3 and if there is no automatic printing plate lift 7 either, the invention may be implemented in accordance with the following scenario: up to the creation of the printing plates 9 by the platesetter 1, this alternative scenario corresponds to the embodiment described above. Since there is no printing plate sorter/stacker 3, the printing plates 9 are deposited on the printing plate transport cart 6 by hand. The printing plate transport cart 6 is then moved to the printing press 4; there, it is not the QR code 8 on the printing plate transport cart 6 that is scanned by means of the scanner 5 but an arbitrary printing plate on the printing plate transport cart 6. The scanning of an arbitrary printing plate causes the associated batch file created in the prepress department 2 to be determined. This batch file is then used to determine all associated print jobs in the file and of the printing plates 9 located on the printing plate transport cart 6. Again, there is the option of adapting the print jobs that have been downloaded to the printing press 4 to the print jobs that are actually located on the printing plate transport cart 6 and/or to adapt the sequence of the print jobs in the printing press 4 to the actual sequence of the print jobs of the printing plates 9 on the printing plate transport cart 6. Subsequently, the printing plates 9 are placed in the printing units of the printing press 4 by hand, the printing press is set up for the print jobs, and the print jobs are processed.

This ensures that the data sent to the printing press 4 matches the printing plates 9 delivered by the transport device 6; if there are deviations, the data of the print jobs is adapted to the printing plates 9 that have actually been delivered by the transport cart 6.

The following is a summary list of reference numerals and the corresponding structure used in the above description of the invention:

1 platesetter
2 prepress software
3 printing plate sorter/stacker
4 printing press
5 scanner
6 printing plate transport cart
7 printing plate lift
8 QR code
9 printing plate

The invention claimed is:

1. A method for correctly mounting printing plates in a printing press to be equipped with the printing plates, the method using prepress software, at least one transport device, at least one identification device disposed on the at least one transport device, and a scanning device at the printing press, which comprises the steps of:
    defining, via the prepress software, a sequence of print jobs to be processed by the printing press;
    sending data for making the printing plates for the print jobs defined in the processing sequence to a platesetter via a communication link;
    producing via the platesetter the printing plates;
    depositing the printing plates on the at least one transport device;
    conveying the at least one transport device to the printing press; and
    reading the at least identification device disposed on the at least one transport device by the scanning device at the printing press and the sequence of print jobs that have been identified in this way are compared to the sequence of print jobs which the prepress software has assigned to the printing press.

2. The method according to claim 1, which further comprises displaying a warning at the printing press if deviations are found between the printing plates on the at least one transport device and the sequence of print jobs which the prepress software has assigned to the printing press.

3. The method according to claim 1, wherein:
    the prepress software receives feedback from the at least one identification device of the at least one transport device; and
    the prepress software identifies the at least one transport device and forwards a result of an identification to the printing press and to the scanning device disposed at the printing press in question.

4. The method according to claim 1, wherein the plate setter includes a downstream sorting and stacking unit for depositing the printing plates produced on the at least one transport device.

5. The method according to claim 1, wherein the at least one transport device is a printing plate transport cart.

6. The method according to claim 1, which further comprises conveying the printing plates from the at least one transport device into the printing press by a printing plate logistics device and pulled in by an automated printing plate changing device.

7. The method according to claim 1, wherein the scanning device at the printing press is a hand-held scanner for reading out the at least one identification device on the at least one transport device or on the printing plates and transmits a result to a control unit of the printing press by wire or wirelessly.

8. The method according to claim 1, wherein when the prepress software defines the sequence of the print jobs, it combines the printing plates lying on the at least one transport device and corresponding jobs in one file.

9. The method according to claim 1, wherein the at least one identification device is a bar code or a quick response code.

10. The method according to claim 6, wherein the printing plate logistics device is a plate cart lift.

* * * * *